Figure 1:
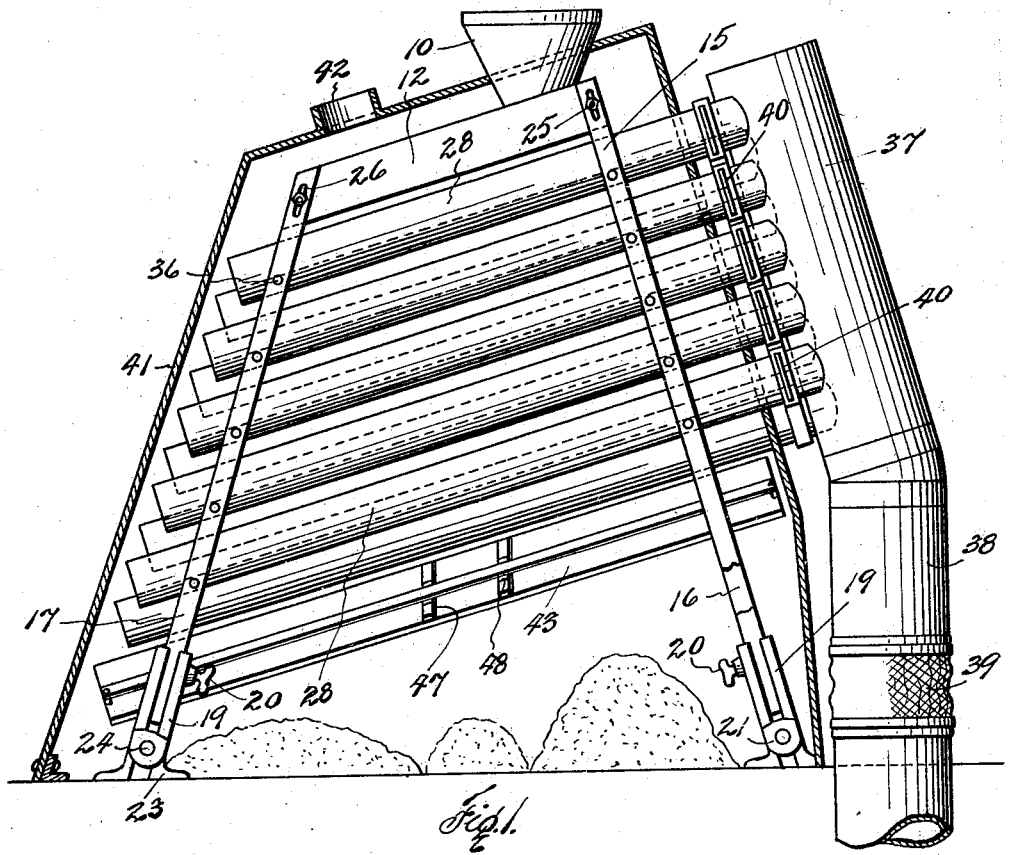

Feb. 25, 1930. O. W. STEELE 1,748,661
SEPARATOR
Filed Jan. 31, 1927 3 Sheets-Sheet 1

Inventor
O. W. Steele
By Jack A. Orkley
Attorney

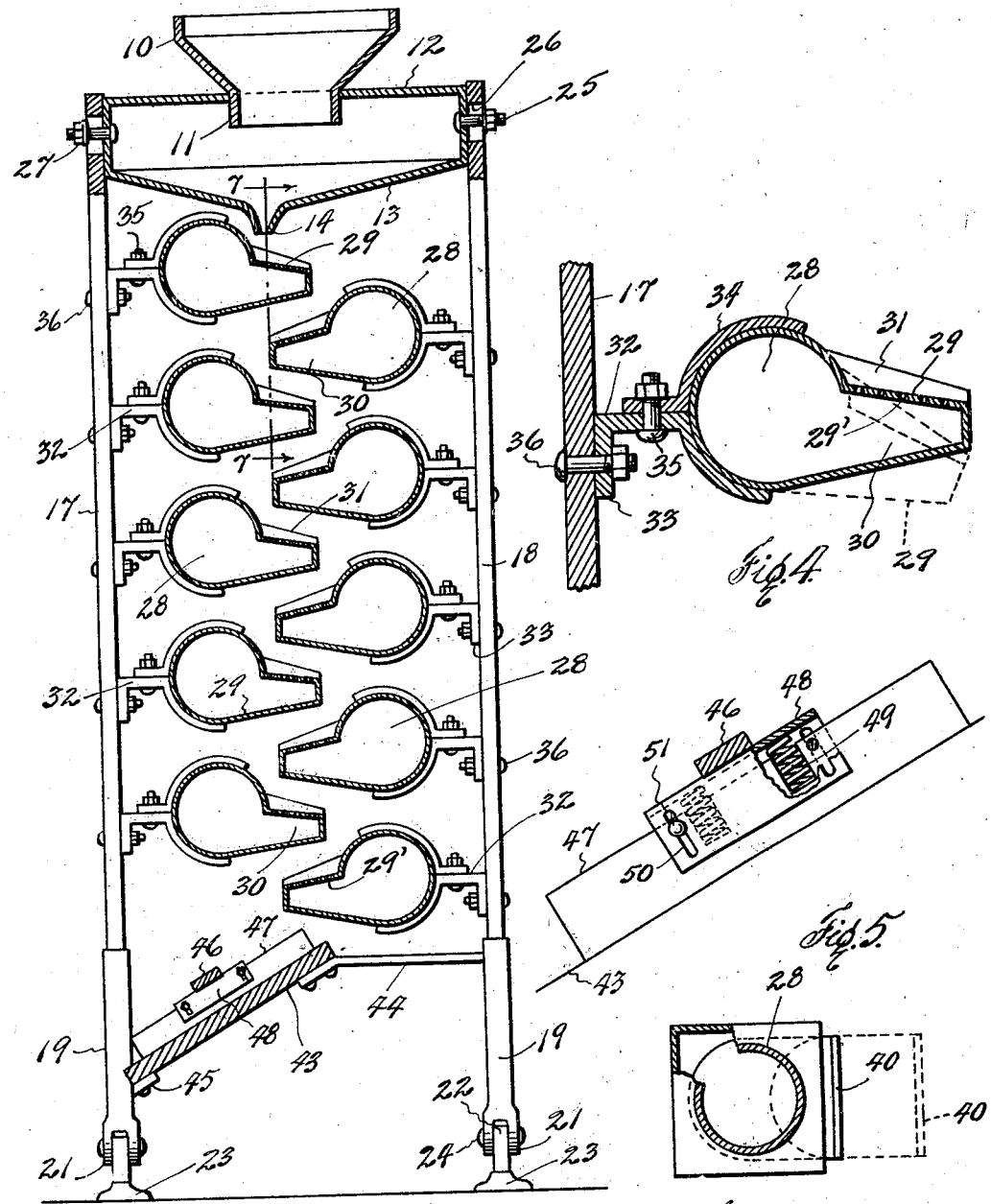

Feb. 25, 1930.  O. W. STEELE  1,748,661
SEPARATOR
Filed Jan. 31, 1927   3 Sheets-Sheet 3
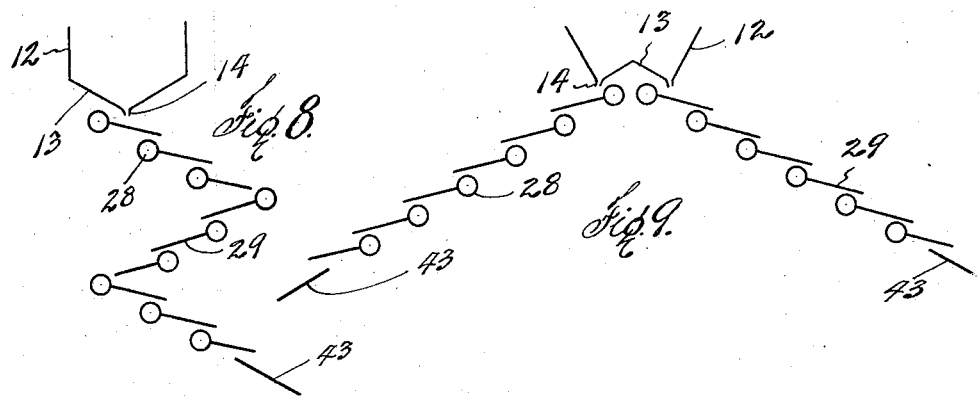
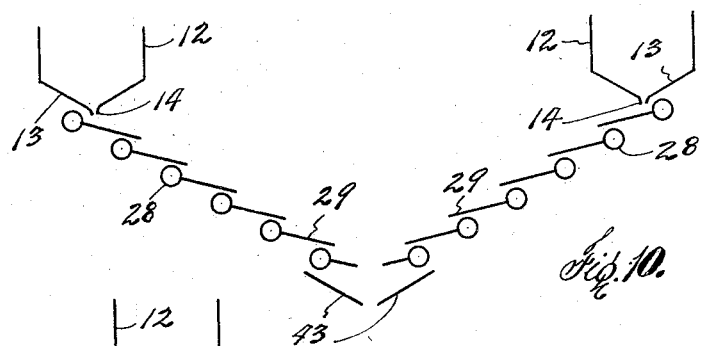
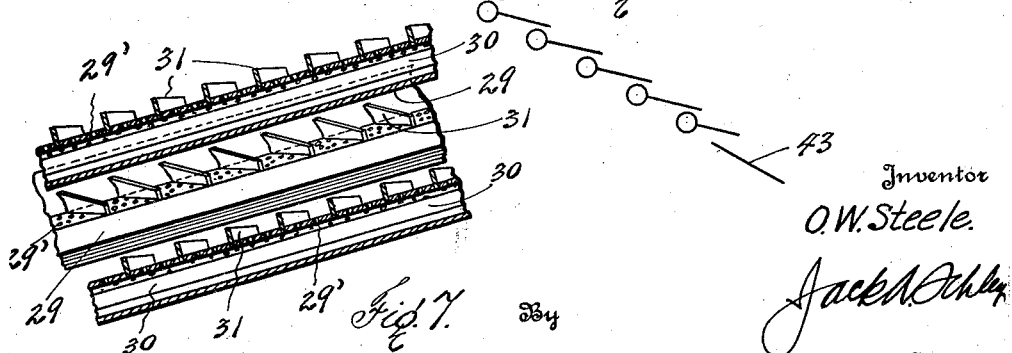
Inventor
O. W. Steele.
By Jack A. Othley
Attorney Patented Feb. 25, 1930

1,748,661

UNITED STATES PATENT OFFICE

OLIVER W. STEELE, OF DALLAS, TEXAS

SEPARATOR

Application filed January 31, 1927. Serial No. 164,703.

This invention relates to new and useful improvements in separators.

The invention has particularly to do with that type of separator in which the materials are caused to travel by gravity, are agitated by a fluid and are segregated by upstanding separating elements.

The object of the invention is to provide a separator including a plurality of stepped separating elements arranged to deflect the heavier particles toward the feed end of the separator while the lighter particles are segregated away from the feed end, whereby the separation of the various materials is effected according to the specific gravity thereof and without mechanical agitation of the separating elements.

Another object of the invention is to provide means for effecting a positive separation between materials having only a slight difference in their specific gravities and to perform such separation in an economical and simple manner.

A particular object of the invention is to provide a separating element including a foraminous surface disposed at an incline and having vanes or riffles arranged counter to the inclination of said surface together with a conductor for supplying a fluid to be ejected upwardly through the foraminous surface to dislodge the materials resting on said surface.

An important object of my invention is to provide a separator which may be constructed of a comparatively few number of parts and in such compact relation that the entire separator will occupy but a comparatively small floor space.

A still further object of the invention is to provide a separator of the type described which will be free from eccentrics, vibrators and other mechanical movers, thus making for a comparatively low production cost, as well as a comparatively low maintenance cost, and obviating to a maximum extent mechanical supervision, replacement and lubrication.

Another important object of the invention is to provide a separator which, owing to its inherent features, may be enclosed in a dust tight housing free from flexible sections and whereby dust, chaff and the like may be readily withdrawn therefrom.

Another object of the invention is to provide a separator including a plurality of stepped longitudinally inclined separating elements provided with separating surfaces and arranged for individual adjustment whereby the transverse inclination of the separating surface of each element may be disposed at various pitches to increase or retard the flow of material from one element to another.

A construction designed to carry out the invention will be hereinafter described, together with other features of the invention.

Figure 2:
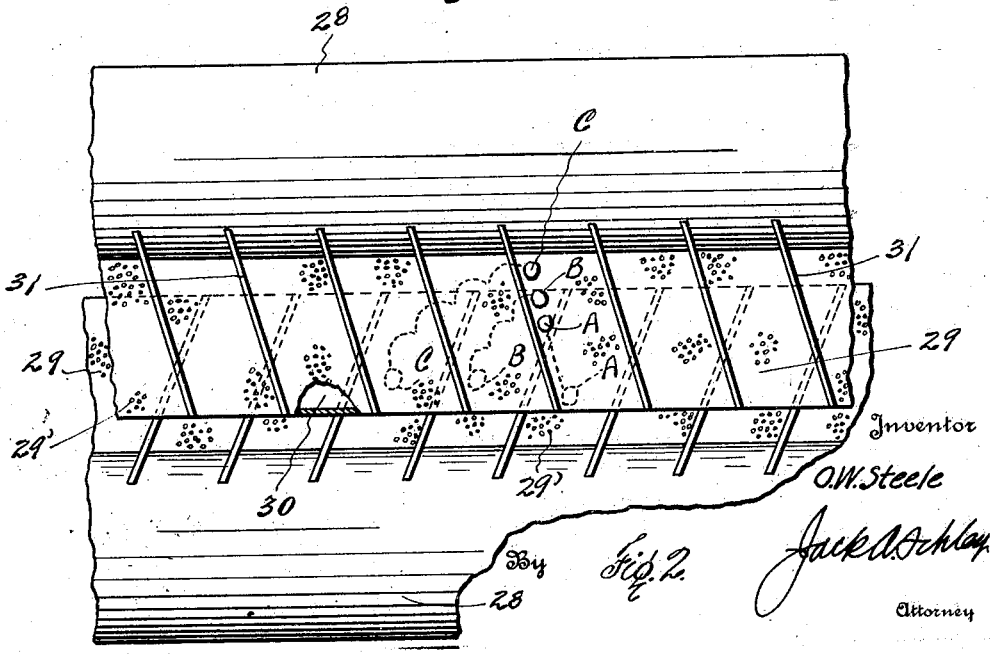

The invention will be more readily understood from a reading of the following specification and by reference to the accompanying drawings, in which an example of the invention is shown and wherein:

Fig. 1 is a view of a separator constructed in accordance with my invention, a portion being shown in elevation and a portion in section, Fig. 2 is a plan view of a portion of two of the elements in their position as shown in Fig. 1, Fig. 3 is a transverse vertical sectional view, Fig. 4 is a sectional view showing one of the separating elements and its bracket, Fig. 5 is a detail of one of the dividing fingers, Fig. 6 is a detail of one of the flue valves, Fig. 7 is a longitudinal vertical sectional view taken on the line 7—7 of Fig. 3, and Figs. 8 to 11 inclusive are diagrammatical views showing cascade arrangements in which the separating elements may be disposed in lieu of the arrangement shown in the other figures.

In the drawings the numeral 10 designates a hopper having a depending collar 11 extending through the top of an elongated feed box 12. The feed box is inclined downwardly and the hopper is disposed at the upper end of said box. The box has a hopper bottom 13 transversely inclined toward a longitudinal discharge spout 14, which has a restricted opening whereby material will be discharged in a vertical sheet longitudinally of the box.

The box is supported at the upper ends of standards which I have numbered 15, 16, 17 and 18 respectively. Each standard has its lower end telescoping into a boot 19 in which it is fastened by a set screw 20. The lower end of each boot is provided with ears 21 straddling a lug 22 extending upwardly from a floor flange 23. The ears 22 are hinged on a bolt 24 carried by the lug 22. It will be seen that each standard is individually adjustable vertically and the swinging yokes permit the standards to be adjusted without changing the inclination of said standards. The standards 15 and 16 are placed on opposite sides of the box 12 at the upper end thereof while the standards 17 and 18 are disposed on opposite sides of said box at the lower end thereof. Stud bolts 25 carried by the sides of the box extend through vertical slots 26 in the upper ends of the standards and are secured by nuts 27, whereby said box has a limited vertical adjustment relatively of the standards.

Between the standards and disposed longitudinally under the bottom 13 of the box I mount a plurality of separating elements, each comprising a longitudinal tubular conductor 28, a laterally projecting foraminous shelf 29 extending longitudinally of the conductor, a radially directed flue 30 underlying the shelf and contiguous to the conductor and a plurality of upstanding vanes 31 mounted transversely on the shelf. The separating element is the gist of my invention and by means of these assembled elements I am enabled to efficiently separate various materials in a highly efficient and economical manner.

The tubular conductor 28 of each element is preferably made circular in cross-section so that it may be rotatably supported and axially adjusted. On the inner side of each standard I mount at different elevations brackets 32, each comprising a downwardly curved arm 33 and an upwardly curved keeper 34 fastened to the shank of the bracket by a bolt 35. The arm 33 and the keeper 34 are curved to conform to the contour of the conductor 28 (Fig. 4) and embrace slightly more than half of the circumference of the conductor, thus retaining it in the bracket.

Each bracket is secured to its respective standard by a bolt 36. I have shown the brackets spaced at regular intervals and mounted so that the flues 30 on one side of the apparatus will overhang the shelves 29 of the elements on the other side, which will produce a cascade arrangement, the separating elements relatively intermeshing at the vertical center of the apparatus. The material in cascading from one shelf to another passes through the air field of the lower shelf and the lighter constituents are retarded by the air in their fall relative to the heavier particles, causing the latter constituents to be fed by the vanes in advance of the lighter particles.

The brackets on the standards 17 and 18 are disposed at lower elevations than the corresponding brackets on the standards 15 and 16 so that the separating elements are inclined downwardly in harmony with the box 12 and relatively to the feed hopper 10. It will be seen that by adjusting the standards 15 and 17 on one side of the apparatus, the separating elements carried thereby may be bodily raised or lowered and their spacing from the separating elements on the other side of the machine thus regulated. The separating elements on the other side of the apparatus may be likewise spaced by adjusting the standards 16 and 18.

The conductors 28 extend beyond the upper ends of the flues 30 and enter a manifold 37, which is connected at its lower end with an air flue 38 including a flexible section 39 and supplied with a current of air from a suitable source, such as a blast fan (not shown). Each conductor includes adjacent the manifold a transverse slide valve 40 (Fig. 6) whereby the supply of air to the flue 30 may be regulated or entirely cut off.

A suitable housing 41 is placed over the apparatus, the hopper 10 extending through the top of the housing and the conductors 28 projecting through one end. This housing may be of convenient construction and arranged to give access to the various parts. Such a housing will prevent the escape of dust and chaff and may be connected with a suitable exhaust system at 42.

By observing Figs. 2 and 7, it will be seen that while the separating elements with their conductors 28 and shelves 29 are inclined longitudinally downward from right to left, the vanes 31 are disposed at such an angle to the longitudinal axis of the conductor as to be directed upwardly toward the feed end of the apparatus. As before described, each shelf 29 inclines downwardly and outwardly from the conductor and by rotating the conductor in its supporting bracket, the angle of this transverse inclination may be increased or reduced so that the transverse pitch of the shelf may be made comaparatively flat or substantially steep. By such an adjustment the speed at which the materials travel outwardly on the shelves may be regulated.

It is pointed out that the separating elements are constructed in rights and lefts so that when placed on opposite sides their vanes will be directed upwardly toward each other and are so arranged that those of one element will be positioned intermediate to those of the element which overhangs it and thus materials dropping from the riffles between the vanes of one element will fall on each side of the intermediate vanes below, as shown in Figs. 2 and 7. Materials fed into the hopper 10 will be received in the box 12 and discharged therefrom through the spout 14 in a sheet longitudinally of the shelf 29 of the uppermost separating unit. Owing to the longitudinal and transverse or double inclination of the shelves the materials will cascade or flow from one element to the other as will be obvious.

The vanes extend across the path of the flowing materials and each being directed toward the upper end of the apparatus will deflect the materials upwardly as they travel outwardly over said shelves. From the foregoing, it will be apparent that particles dropping from one riffle or trough between the vanes of an upper shelf will fall on opposite sides of a vane on the shelf below (Fig. 2) and the lower vane will convey the particles toward the upper end of the element. This action will be repeated from shelf to shelf. The particles of which the various materials are composed will, of course, vary in specific gravity and by directing a blast of air upwardly through the perforations 29' of the shelves 29, some of these particles will be displaced upwardly by said air. The perforations are preferably minute so as to permit close spacing and individual agitation of the particles.

It will be apparent that the heavier particles will not be as readily lifted by the air blast as the lighter particles. As an illustration, I have shown in Fig. 2 three particles and designated the same as follows: A is the heaviest, B is middling and C is the lightest in weight. The blast of air escaping upwardly through the perforations 29' of the shelves 29 will not be strong enough to lift the heaviest particles A (Fig. 2) high enough for said particles to fall over the vanes, therefore said particles A will follow along the vanes and work toward the upper or feed end of the apparatus The middling particles B will be lifted higher than the vanes, particularly toward the outer ends, because said vanes incline downwardly toward their outer ends. Owing to the downward inclination of the shelves, longitudinally and the upward angle of the vanes, the tendency of the particles B will be to deflect downwardly and fall over the vane into the next riffle as is indicated in dotted lines in Fig. 2.

It is likely that the particles B will travel some distance outwardly in a riffle before reaching a point where the vane is low enough to permit its passage thereover. The lightest particles C are easily lifted and may jump two vanes in passing outwardly on a shelf. It is evident that as the particles are cascaded from one shelf to the other they will follow and jump the vanes according to their specific gravities and the inclination of the top edges of the vanes. The separation may be controlled and regulated by varying the blast of air through the agency of the valves 40 as well as by adjusting the elements in the brackets 32 to tilt the shelves or by vertically adjusting the standards to change the longitudinal inclination or the vertical spacing of the elements. Also, air may be supplied in intermittent blasts.

In Figs. 8 to 11 I have indicated diagrammatically other arrangements of the separating elements. Some materials will separate to better advantage in one form than in another. For instance, very heavy materials will separate more satisfactorily in the form shown in Fig. 10 than in the form shown in Fig. 2. The form shown in Fig. 9 is better for the more difficult separations; whereas the form shown in Fig. 11 has a greater capacity and will handle two commodities in the same apparatus. Other variations may be used.

Below the separating elements I mount an inclined finger board 43 on brackets 44 and 45 secured to the standards. The lowermost shelf 29 overhangs the upper edge of said board, as is clearly shown in Fig. 3. A longitudinal keeper bar 46 is disposed over the central portion of the board and finger bars 47 mounted on the board are disposed under said bar. As is shown in Fig. 5, each finger bar is provided with a friction retainer comprising a yoke shaped saddle 48 straddling the finger bar and supported on coiled springs 49 countersunk in the bar. The saddle is divided on each side with vertical slots 50 receiving pins 51 projecting from the side of the bar 47.

The spring pressed saddle will frictionally engage the underside of the keper bar 46, whereby the finger bar will be held in the position to which it is adjusted. It will be seen that the bars may be removed so as to separate the different materials into zones as they drop off of the last shelf 29, thus causing the segregated materials to be separately delivered from the board 43 into any suitable receptacle or conveyor (not shown). Finger boards are commonly used in this art and the adjustment and manipulation of the same is well known. It will be seen that by adjusting the separating elements and controlling the air, separation according to specific gravity may be regulated to a minute degree and thus it is possible to cleanly separate materials having only a slight difference in specific gravities.

Various changes in the size and shape of the different parts, as well as modifications and alterations, may be made within the scope of the appended claims.

What I claim, is:

1. In a separator, a stationary longitudinally and transversely inclined shelf, diagonal deflectors thereon extending from the feed side toward the higher end while retaining a downward inclination of the shelf, means for passing fluid upwardly through said shelf to carry lighter material over the deflectors in the direction of the lower end, and means for feeding material to the higher side of the shelf.

2. In a separator, a stationary longitudinally and transversely inclined shelf, diagonal deflectors thereon extending from the feed side toward the higher end while retaining a downward inclination of the shelf, means for passing fluid through said shelf to carry lighter material over the deflectors in the direction of the lower end, means for feeding material to the higher side of the shelf, and a similarly inclined shelf arranged below the first mentioned shelf and having reversely disposed deflectors to receive material discharged from the superposed shelf at the lower ends of the reversely disposed deflectors.

3. A separating element comprising a stationary foraminous shelf adapted to support and feed material by gravity thereof, said shelf being inclined longitudinally and transversely, means for effecting a fluid pressure through said shelf to raise certain particles therefrom, and laterally disposed deflecting means upon the supporting face of said shelf for feeding material thereon in a direction upwardly of the longitudinal inclination thereof.

4. In a separator, a stationary longitudinally inclined element having a material conducting surface inclined transversely to discharge at its vertically inclined edge, upwardly inclined barriers disposed across the downward flow of material over said element for segregating the said materials and feeding a portion thereof in a direction upwardly of the longitudinal inclination of the surface, and fluid pressure means for displacing upwardly the particles of material flowing over said elements, whereby the lighter particles are lifted across the barriers and the heavier particles retained and fed thereby to the discharge edge.

5. In a separator, the combination of upright supports, a fixed separating element mounted between said supports and having a curved fluid conducting body and a communicating parallel longitudinal separating shelf at its free edge over which material is adapted to travel, and clamping means embracing said body for adjusting the element on the supports transversely of its length whereby the transverse inclination of its shelf may be varied.

6. In a separator, the combination of upright supports, a fixed separating element mounted between said supports and having a curved body and parallel longitudinal separating shelf at its free edge over which material is adapted to travel, and clamping means embracing said body for transversely adjusting the element on the supports whereby the transverse inclination of its shelf may be varied, said element being inclined longitudinally and the shelf thereof provided with lateral barriers extending upwardly from the body to discharge at the free edge of the shelf.

7. In a separator, a plurality of stationary pervious elements inclined longitudinally and transversely with discharge edges overhanging each other for cascading materials from one element to the next element, fluid pressure means for displacing upwardly certain particles of materials flowing over said elements, and oppositely inclined barriers disposed laterally upon the elements to direct particles retained by the barriers in a path upwardly of the longitudinal inclination and to discharge such particles intermediate the barriers upon a succeeding element.

8. In a separator, a plurality of stationary separating elements adapted to support all materials to be separated and disposed in stepped order with portions overhanging each for cascading materials from one element to the next element, each element having its delivery directed toward the center of the separator and formed with barriers disposed across the flow of materials over the element and discharging at one end upon a succeeding element having oppositely inclined barriers for segregating materials.

9. In a separator, upright supports, a plurality of stationary separating elements mounted between the supports in stepped order, and means for supplying air to said elements, each element comprising a longitudinal conductor and a communicating foraminous separating shelf extending longitudinally of the conductor and barriers extending transversely of the shelves and inclined upwardly at their discharge end, the barriers upon an upper shelf being at an opposite angle to the barriers upon the shelf next below and feeding material from one shelf to another.

10. As a sub-combination in a separator, a separating element comprising an elongated tubular conductor, a foraminous shelf extending longitudinally of the conductor, a fluid pressure flue underlying the shelf and communicating with the conductor, and upstanding vanes of equal length mounted on the upper face of the shelf and extending outwardly from the conductor to the discharge edge of the shelf and being disposed at an upward inclination to the transverse axis of the element to discharge at the free edge of the shelf at a point above the feed of material thereto.

11. As a sub-combination in a separator, a separating element comprising an elongated tubular conductor, a foraminous shelf extending longitudinally of the conductor, a fluid pressure flue underlying the shelf and communicating with the conductor, and upstanding vanes of equal length mounted upon the upper face of the shelf with their upper edges inclined downwardly from the conductor to the discharge edge of the shelf and being disposed at an upward inclination to the transverse axis of the element to discharge at the free edge of the shelf at a point above the feed of material thereto.

12. The method of separating materials according to the specific gravity of their particles, which consists in successively cascading said materials in their passage between separated superposed stationary paths having longitudinal downward inclination and also oppositely inclined downwardly toward a central zone, retarding the flow of material over said paths, and subjecting all such particles to upward fluid pressure along each path and also to such pressure when cascading.

In testimony whereof I affix my signature.

OLIVER W. STEELE.